United States Patent
Nash et al.

(10) Patent No.: US 9,103,582 B2
(45) Date of Patent: Aug. 11, 2015

(54) SHELF ASSEMBLIES FOR REFRIGERATOR APPLIANCES AND METHODS FOR ASSEMBLING SAME

(71) Applicant: General Electric Company, Schenectady, NY (US)

(72) Inventors: Jonathan Ian Nash, La Grange, KY (US); Edward Arul Sureshkumar Mathuram, Hyderabad (IN)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 14/096,526

(22) Filed: Dec. 4, 2013

(65) Prior Publication Data

US 2015/0153099 A1  Jun. 4, 2015

(51) Int. Cl.
*A47B 96/04* (2006.01)
*F25D 25/02* (2006.01)
*F25D 23/06* (2006.01)
*B23P 19/04* (2006.01)

(52) U.S. Cl.
CPC ............... *F25D 25/024* (2013.01); *B23P 19/04* (2013.01); *F25D 23/062* (2013.01)

(58) Field of Classification Search
CPC ..... F25D 25/02; F25D 25/024; F25D 23/062; B23P 19/04
USPC ............ 312/408, 410; 108/71, 73, 76, 77, 78, 108/93, 108
See application file for complete search history.

(56) References Cited

U.S. PATENT DOCUMENTS

| 2,465,806 | A | * | 3/1949 | Jewell | 211/153 |
|---|---|---|---|---|---|
| 3,859,932 | A | * | 1/1975 | Armstrong et al. | 108/75 |
| 8,403,438 | B2 | | 3/2013 | Park et al. | |
| 8,814,287 | B2 | * | 8/2014 | Jang | 312/408 |
| 8,840,205 | B2 | * | 9/2014 | Chellappan et al. | 312/408 |
| 2007/0176528 | A1 | * | 8/2007 | Lee et al. | 312/408 |
| 2009/0250420 | A1 | * | 10/2009 | Martin et al. | 211/134 |
| 2010/0109498 | A1 | * | 5/2010 | Ramm et al. | 312/408 |
| 2010/0181884 | A1 | * | 7/2010 | De La Garza et al. | 312/408 |
| 2011/0001415 | A1 | * | 1/2011 | Park et al. | 312/408 |
| 2011/0115356 | A1 | * | 5/2011 | Nash et al. | 312/408 |
| 2012/0091084 | A1 | * | 4/2012 | Amaral et al. | 211/80 |
| 2013/0020922 | A1 | * | 1/2013 | Jang | 312/408 |
| 2014/0239792 | A1 | * | 8/2014 | Chellappan et al. | 312/408 |

FOREIGN PATENT DOCUMENTS

| DE | 19750473 | A1 | * | 5/1999 | F25D 23/04 |
|---|---|---|---|---|---|
| JP | 01084085 | A | * | 3/1989 | F25D 25/02 |
| JP | 07332843 | A | * | 12/1995 | F25D 25/02 |
| JP | 08035765 | A | * | 2/1996 | F25D 25/02 |
| JP | 2002090054 | A | * | 3/2002 | F25D 25/02 |

* cited by examiner

*Primary Examiner* — Hanh V Tran
(74) *Attorney, Agent, or Firm* — Dority & Manning, P.A.

(57) ABSTRACT

Shelf assemblies, methods for assembling shelf assemblies, and refrigerator appliances are provided. A shelf assembly includes a fixed shelf, the fixed shelf including a pair of guides that each extend along a lateral direction. The shelf assembly further includes a movable shelf slidably mounted to the fixed shelf, the movable shelf including a pair of guides that each extend along the lateral direction. In an extended position, the pair of guides of the movable shelf cantilever from the pair of guides of the fixed shelf.

20 Claims, 9 Drawing Sheets

SHELF ASSEMBLIES FOR REFRIGERATOR APPLIANCES AND METHODS FOR ASSEMBLING SAME

FIELD OF THE INVENTION

The present subject matter relates generally to refrigerator appliances, and more particularly to shelf appliances and methods for assembling shelf appliances for use in refrigerator appliances.

BACKGROUND OF THE INVENTION

Refrigerator appliances generally include a cabinet that defines a chilled chamber for receipt of food items for storage. Refrigerator appliances also generally include various combinations of shelves, bins, and drawers positioned within the chilled chamber to assist with storage of food items therein. Certain refrigerator appliances include adjustable shelves that permit an appliance user to adjust the shelves between various configurations. For example, adjustable shelves can permit the appliance user to adjust a height or a length of the shelves.

Certain adjustable shelves include a fixed glass plate and a movable glass plate that can slide below the fixed glass plate. Such adjustable shelves can include brackets that support the glass plates within the chilled chamber. Generally, such brackets are connected to each other with cross-bars that extend between the brackets below the glass plates. Additionally, such brackets typically extend beyond the fixed plate to support the movable plate when the plate is in an extended position.

Adjustable shelves having such brackets and cross-bars have certain drawbacks. For example, cross-bars can consume valuable storage space below the adjustable shelves. Also, cross-bars can be visually unappealing or unattractive. Further, cross-bars can be expensive and add to the overall cost of the refrigerator appliance. Brackets or other extended structures which support the movable plate when in the extended position remain extended past the fixed plate even when the movable plate has been retracted, thus additionally consuming valuable storage space in front of the shelves and limiting the size of items to be stored.

Accordingly, a refrigerator appliance with features for securely and reliably mounting an adjustable shelf within a refrigerator appliance, as well as methods for assembling such shelf, would be useful. In particular, a refrigerator appliance with features for mounting an adjustable shelf within a refrigerator appliance and associated assembly methods that does not require cross-bars and that do not require brackets or other extended structures to support movable plates thereof would be useful.

BRIEF DESCRIPTION OF THE INVENTION

In accordance with one embodiment, a refrigerator appliance is disclosed. The refrigerator appliance defines a vertical direction, a lateral direction, and a transverse direction, the vertical, lateral, and transverse directions being mutually perpendicular. The refrigerator appliance includes a cabinet that defines a chilled chamber for receipt of food items for storage, the cabinet extending between a front portion and a back portion along the lateral direction, the cabinet having a back wall positioned at the back portion of the cabinet and defining an opening for accessing the chilled chamber of the cabinet at the front portion of the cabinet. The refrigerator appliance further includes a shelf assembly positioned within the chilled chamber of the cabinet. The shelf assembly includes a fixed shelf, the fixed shelf including a pair of guides that each extend along the lateral direction. The shelf assembly further includes a movable shelf slidably mounted to the fixed shelf, the movable shelf including a pair of guides that each extend along the lateral direction. In an extended position, the pair of guides of the movable shelf cantilever from the pair of guides of the fixed shelf.

In accordance with another embodiment, a shelf assembly is disclosed. The shelf assembly defines a vertical direction, a lateral direction, and a transverse direction, the vertical, lateral, and transverse directions being mutually perpendicular. The shelf assembly includes a fixed shelf, the fixed shelf including a pair of guides that each extend along the lateral direction. The shelf assembly further includes a movable shelf slidably mounted to the fixed shelf, the movable shelf including a pair of guides that each extend along the lateral direction. In an extended position, the pair of guides of the movable shelf cantilever from the pair of guides of the fixed shelf.

In accordance with another embodiment, a method for assembling a shelf assembly is disclosed. The method includes sliding a movable shelf through a back entrance defined in a fixed shelf such that the movable shelf is slidable between an extended position and a retracted position. In the extended position, the movable shelf cantilevers from the fixed shelf.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
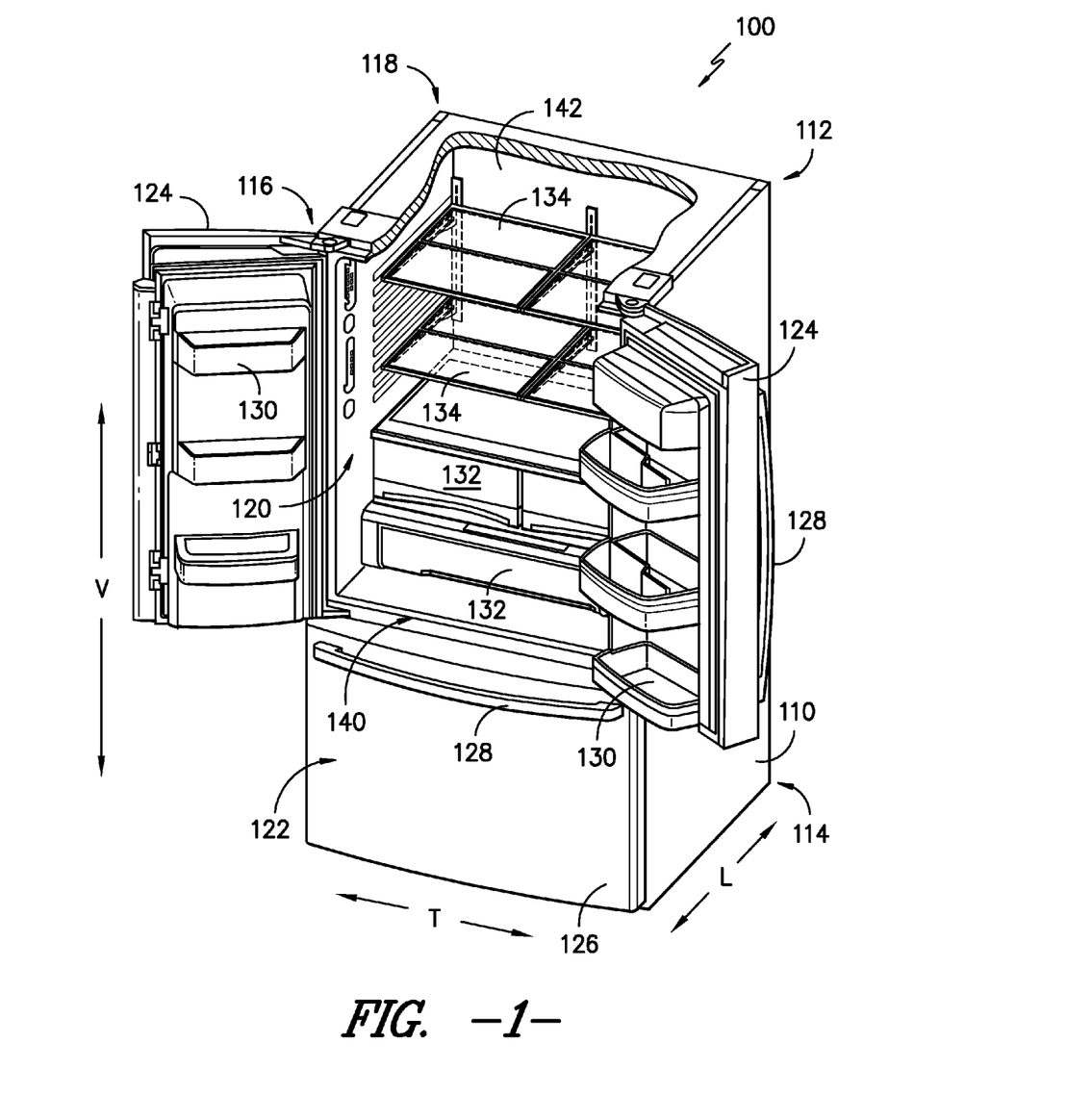
FIG. 1 provides a perspective view of a refrigerator appliance according to an exemplary embodiment of the present subject matter with doors of the refrigerator appliance shown in an open position and portions of a cabinet of the refrigerator appliance removed to reveal certain components of the refrigerator appliance.

FIG. 1 provides a perspective view of a refrigerator appliance 100 according to an exemplary embodiment of the present subject matter. Refrigerator appliance 100 defines a vertical direction V, a lateral direction L, and a transverse direction T. The vertical, lateral, and transverse directions V, L, and T are mutually perpendicular and form an orthogonal direction system.

Refrigerator appliance 100 includes a base cabinet or housing 110 that extends between a top portion 112 and a bottom portion 114 along the vertical direction V. Housing 110 defines chilled chambers for receipt of food items for storage. In particular, housing 110 defines fresh food chamber 120 positioned at or adjacent top portion 112 of housing 110 and a freezer chamber 122 arranged at or adjacent bottom portion 114 of housing 110. As such, refrigerator appliance 100 is generally referred to as a bottom mount refrigerator appliance. It is recognized, however, that the benefits of the present disclosure apply to other types and styles of refrigerator appliances such as, e.g., a top mount refrigerator appliance or a side-by-side style refrigerator appliance. Consequently, the description set forth herein is for illustrative purposes only and is not intended to be limiting in any aspect to any particular refrigerator chamber configuration.

Housing 110 also extends between a front portion 116 and a back portion 118, e.g., along the lateral direction L. Housing 110 defines an opening 140 for accessing fresh food chamber 120 at or adjacent front portion 116 of housing 110. Housing 110 also includes a back wall 142 positioned at or adjacent back portion 118 of housing 110.

Refrigerator doors 124 are rotatably mounted or hinged to an edge of housing 110, e.g., at front portion 116 of housing 110, for selectively accessing fresh food chamber 120. In addition, a freezer door 126 is arranged below refrigerator doors 124 for selectively accessing freezer chamber 122. Freezer door 126 is coupled to a freezer drawer (not shown) slidably mounted within freezer chamber 122. Refrigerator doors 124 are shown in an open position and freezer door 126 are shown in a closed position in FIG. 1. In the open position, refrigerator doors 124 permit access to fresh food chamber 120 through opening 140. Conversely, refrigerator doors 124 obstruct or limit access to fresh food chamber 124 through opening 140 in the closed position. Freezer door 126 operates similarly. Handles 128 can assist with adjusting refrigerator doors 124 and freezer door 126 between the open and closed positions.

Various storage components are mounted within fresh food chamber 120 to facilitate storage of food items therein as will be understood by those skilled in the art. In particular, the storage components include bins 130, drawers 132, and shelves 134 that are mounted within fresh food chamber 120. Bins 130, drawers 132, and shelves 134 are configured for receipt of food items (e.g., beverages and/or solid food items) and may assist with organizing such food items. As an example, drawers 132 can receive fresh food items (e.g., vegetables, fruits, and/or cheeses) and increase the useful life of such fresh food items.

Referring now to FIGS. 2 through 10, shelf assemblies 200 are provided. A shelf assembly 200 according to the present disclosure is configured for use in any suitable refrigerator appliance. As an example, shelf assembly 200 may be positioned within fresh food chamber 120 of refrigerator appliance 100 and utilized as one of shelves 134.

Shelf assembly 200 may include a pair of brackets 210. Brackets 210 are spaced apart from each other, e.g., along the transverse direction T. Brackets 210 can be mounted to cabinet 110, e.g., at back wall 142 of cabinet 110. In particular, brackets 210 extend between a distal end portion 212 and a proximal end portion 214, e.g., along the lateral direction L. Distal end portion 212 of brackets 210 can be positioned at back wall 142 of cabinet 110. Conversely, proximal end portion 214 of brackets 210 can positioned within fresh food chamber 120, e.g., adjacent front portion 116 of cabinet 110.

Shelf assembly 200 further includes a fixed shelf 220. Fixed shelf 220 may, for example, be mounted to the brackets 210. The fixed shelf 220 may thus generally extend transversely between and connect the brackets 210. Fixed shelf 220 may include a pair of guides 222, which may each extend along the lateral direction L and be spaced apart along the transverse direction T. As shown, each guide 222 may be connected to a respective bracket 210. For example, a guide 222 may be connected to a respective bracket 210 at various locations. As shown, a first connection 224 may be provided adjacent proximal end portion 214 of a bracket 210, and a second connection 226 may be provided adjacent distal end portion 212. Each connection 224, 226 may comprise a suitable mechanical fastener 228, such as a screw, nail, nut/bolt combination, rivet, etc., which extends through and connects together a guide 222 and bracket 210.

Figure 5:
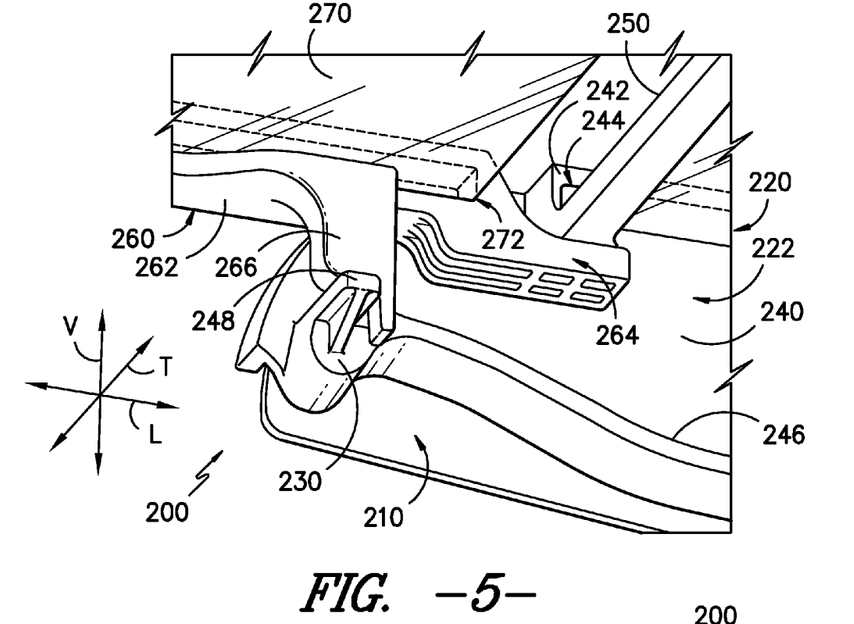
FIG. 5 provides a perspective view of a cantilevered connection between a fixed shelf and a movable shelf of a shelf assembly in accordance with one embodiment of the present disclosure.

Referring briefly to FIG. 5, a connection 224, 226 may further include a connection pocket 230 extending from a frame 240 of the guide 222. The pocket 230 may define a bore (not shown) therein in which a mechanical fastener 228 may extend and be seated to couple a guide 222 and bracket 210 together. Connection pocket 230 may generally extend in the transverse direction, as illustrated. During assembly, brackets 210 may be slid into slots on guides 222, and mechanical fasteners 228 may then be utilized to connect the brackets and guides 222. The connection of brackets 210 to guides 222 may contribute to the rigidity of the shelf assembly 200 generally, thus facilitating the elimination of cross-bars.

Alternatively, shelf assembly 200 need not include brackets 210. In these embodiments, for example, fixed shelf 220, such as the guides 222 thereof, may be directly mounted to cabinet 110.

As mention, and referring again to FIGS. 2 through 10, each guide 222 may include a frame 240. Frame 240 may be connected to a bracket 210, and various guide 222 components may extend from the frame 240. For example, a track 242 may protrude from the frame 240, such as in the transverse direction T. Track 242 may define a slot 244 extending along the lateral direction L. The slot 244 may be configured to contain a side end of a platform 250, such as a glass plate or a plate formed of any other suitable material, therein. The platform 250 may extend transversely between the opposing guides 222, such that food items can be placed on and/or stored on the platform 250, e.g., within fresh food chamber 120.

Figure 2:
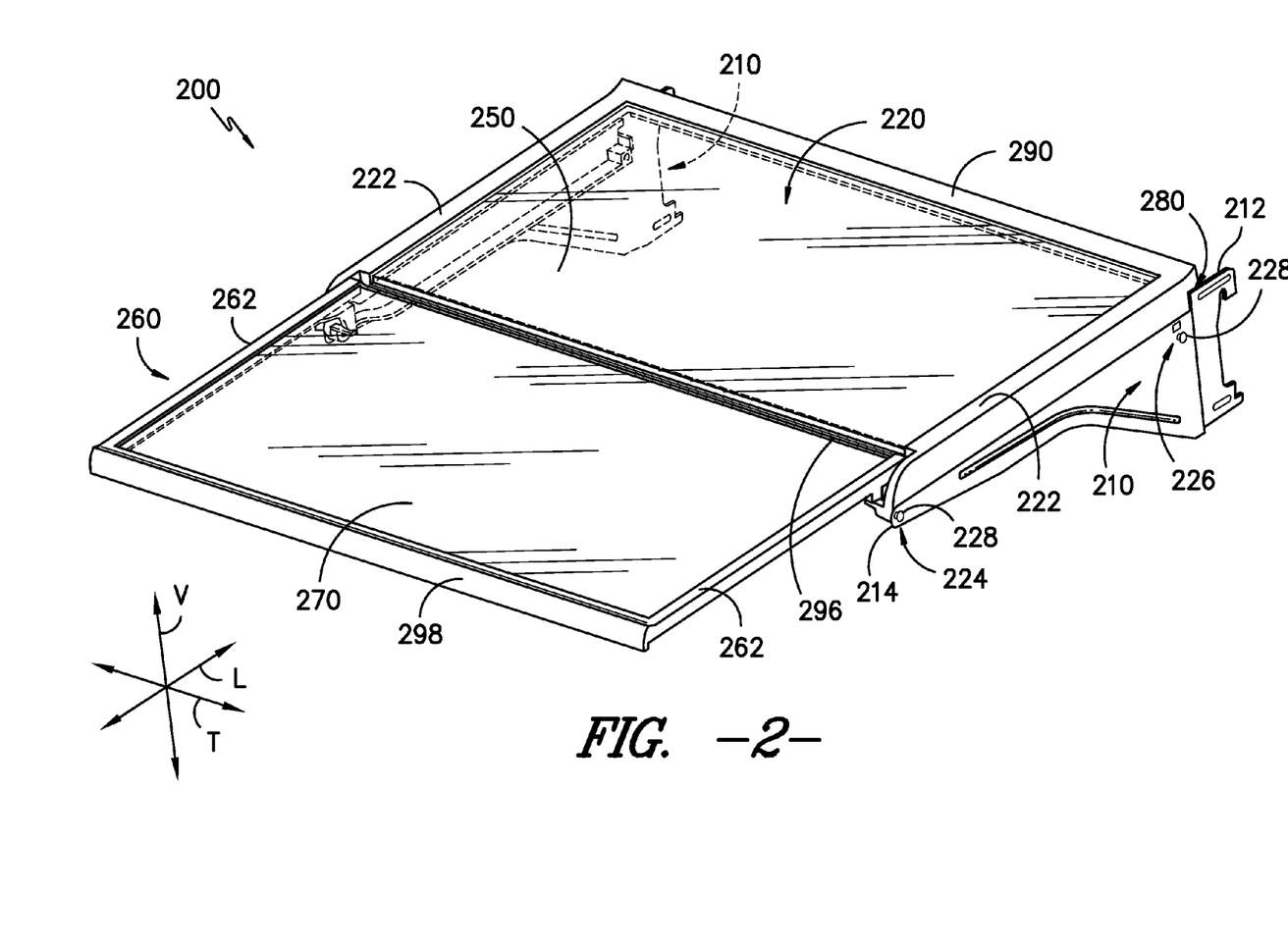
FIG. 2 provides a perspective view of a shelf assembly with a movable shelf of the shelf assembly shown in an extended position in accordance with one embodiment of the present disclosure.
Figure 3:
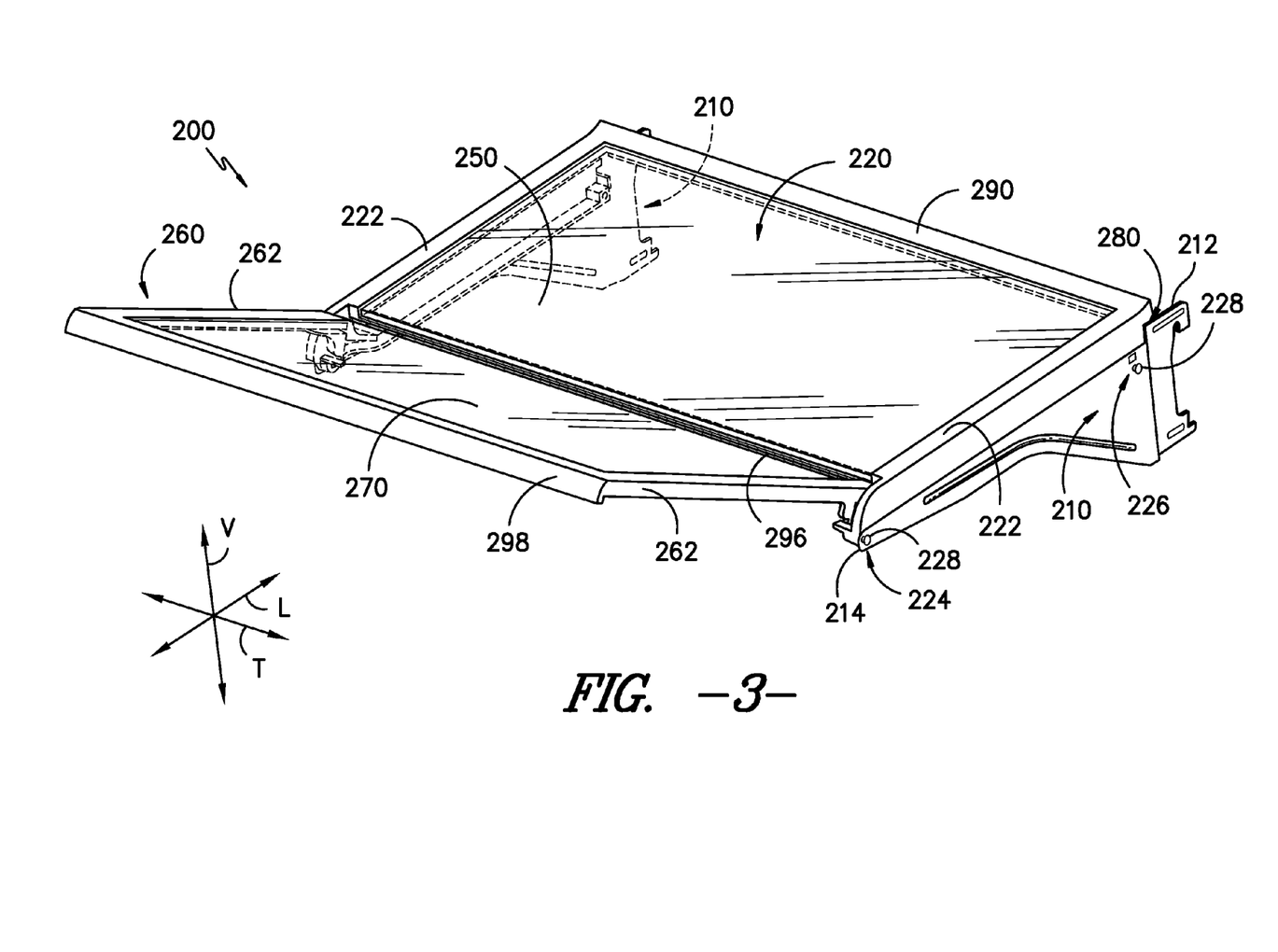
FIG. 3 provides a perspective view of a shelf assembly with a movable shelf of the shelf assembly shown between an extended position and a retracted position in accordance with one embodiment of the present disclosure.
Figure 4:
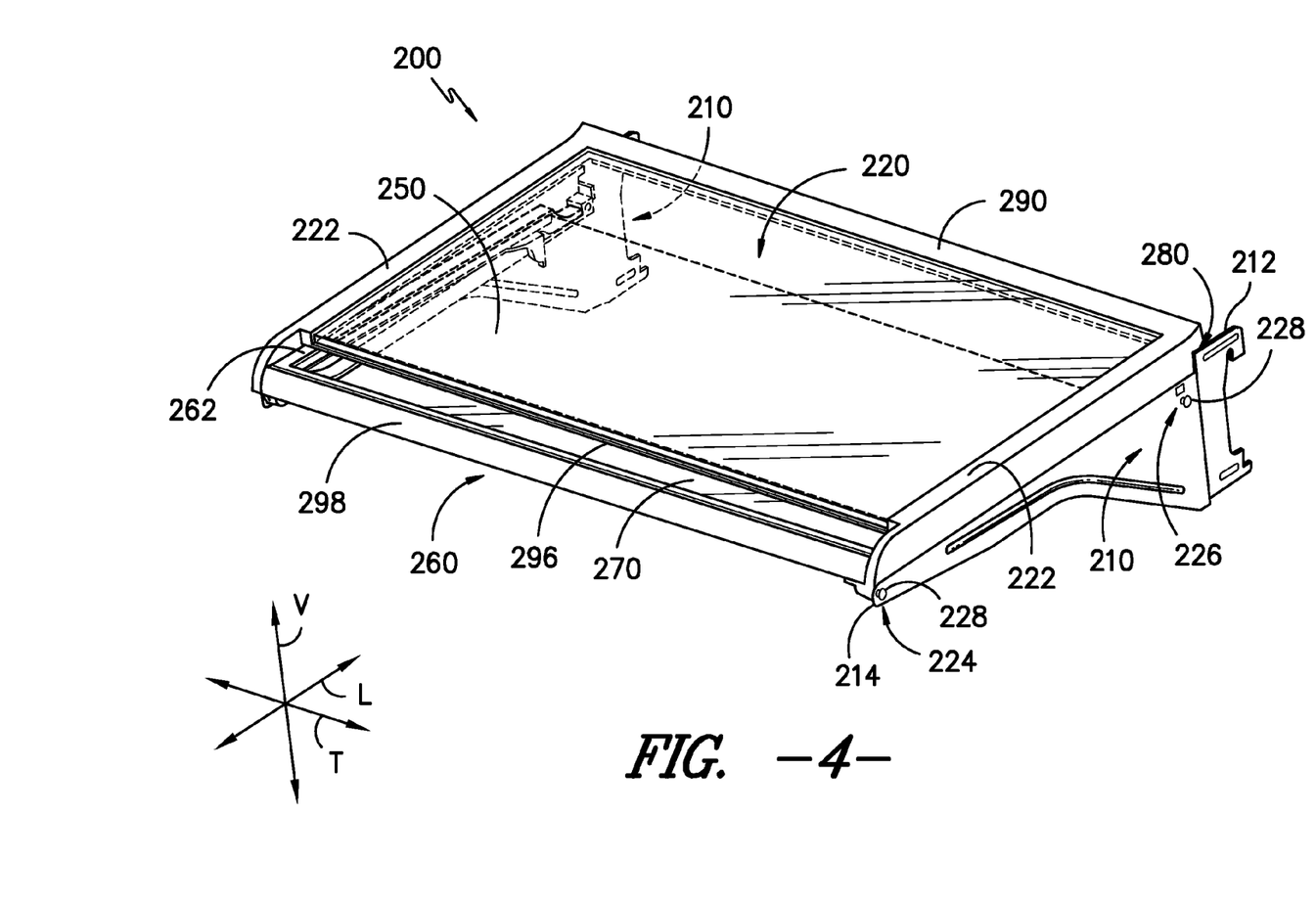
FIG. 4 provides a perspective view of a shelf assembly with a movable shelf of the shelf assembly shown in a retracted position in accordance with one embodiment of the present disclosure.

Additionally, a guide lip 246 may protrude from frame 240, such as in the transverse direction T. Lip 246 may extend along the lateral direction L, and may be configured to support a movable shelf (discussed herein) when the movable shelf is in or being moved to a retracted position, as illustrated in FIGS. 2 and 3.

Further, a support tab 248 may extend, such as generally transversely, from the frame 240 of each guide 222. Support tab 248 may be configured to support the movable shelf when the movable shelf is in an extended position, as illustrated in FIG. 1.

Shelf assembly 200 further includes a movable shelf 260. Movable shelf 260 is slidably mounted to the fixed shelf 220, such that movable shelf 260 is movable between an extended position and a retracted position. Movement, such as sliding, of the movable shelf 260 may generally be in the lateral direction L. FIG. 1 illustrates the movable shelf 260 in the extended position. FIG. 2 illustrates the movable shelf 260 between the extended and retracted positions. FIG. 3 illustrates the movable shelf 260 in the retracted position.

Movable shelf 260 may include a pair of guide 262, which may each extend along the lateral direction L and be spaced apart along the transverse direction T. Each guide 262 may be slidably mounted to a respective guide 222 of the fixed shelf 220, and may thus be movable, such as in the lateral direction L, with respect to the associated fixed shelf 220. For example, each guide 262 may be slidable along the guide lip 246 of the associated guide 222. Further, advantageously, the guides 262 may when in the extended position, as shown in FIG. 1, cantilever from the guides 222. For example, as shown and as discussed herein, various components of the guides 222 may support the guides 262 at or near back ends thereof. The guides 262 may cantilever from the guides 222, such that no support is provided along the sides or front of the guides 262, other than that support at or near the back ends as discussed herein.

Such cantilevered design advantageously facilitates the elimination of brackets that extend to support the sides of the guides 262, and which thus consume storage space when the movable shelf 260 is retracted. For example, in exemplary embodiments as shown, a portion of each guide 262 when in the extended position extends beyond the associated guide 222 of the fixed shelf 220, as well as the associated bracket 210. Thus, these portions of the shelf 260 extend beyond and are cantilevered with respect to the brackets 210 and fixed shelf 220.

Referring to FIG. 5, various features for facilitating the cantilevered design of a shelf assembly 200 according to the present disclosure are illustrated. As shown, for example, each guide 262 may include a tab 264. Tab 264 may, for example, extend in the lateral direction L. Each tab 264 may be configured to contact the associated guide 222 of the fixed shelf 220, such as the track 242 thereof, when the movable shelf 260 is in the extended position. As shown, for example, tab 264 may, when the shelf 260 is in the extended position, contact an underside of the track 242 and impart a force on the track 242 in the vertical direction V. Such contact and force may facilitate the cantilevered design of the shelf assembly 200.

Each guide 262 may further include a leg 266. Leg 266 may, for example, extend vertically (in the vertical direction V) from the guide 262. Each leg 266 may be configured to contact the associated guide 222 of the fixed shelf 220, such as the support tab 248 thereof, when the movable shelf 260 is in the extended position. As shown, for example, leg 266 may, when the shelf 260 is in the extended position, contact a top side of the support tab 248 and impart a force on the support tab 248 in the vertical direction V. Such contact and force may facilitate the cantilevered design of the shelf assembly 200.

A first connection 224 of a bracket 210 and guide 222 is illustrated in FIG. 5. Further, as shown and in exemplary embodiments, such first connection 224 may be aligned along the vertical direction V with the respective support tab 248 of the associated guide 222. Thus, when shelf 260 is in the extended position and leg 266 is in contact with support tab 248, the force transmitted in the vertical direction by leg 266 to support tab 248 may further be transmitted through support tab 248 to first connection 224 and the associated bracket 210. The use of fasteners 228 disposed in pockets 230 further advantageously allow increased forces to be so transmitted. Thus, such force applied to shelf 260 is advantageously distributed throughout the shelf assembly 200, which further advantageously facilitates the cantilevered design of the shelf assembly 200.

Referring again to FIGS. 2 through 10, movable shelf 260 may further include a platform 270. A slot 272 may be defined in each guide 262 of the movable shelf 260 extending along the lateral direction. Slot 272 may be configured to contain a side end of platform 260, such as a glass plate or a plate formed of any other suitable material, therein. The platform 270 may extend transversely between the opposing guides 262, such that food items can be placed on and/or stored on the platform 270, e.g., within fresh food chamber 120.

Figure 6:
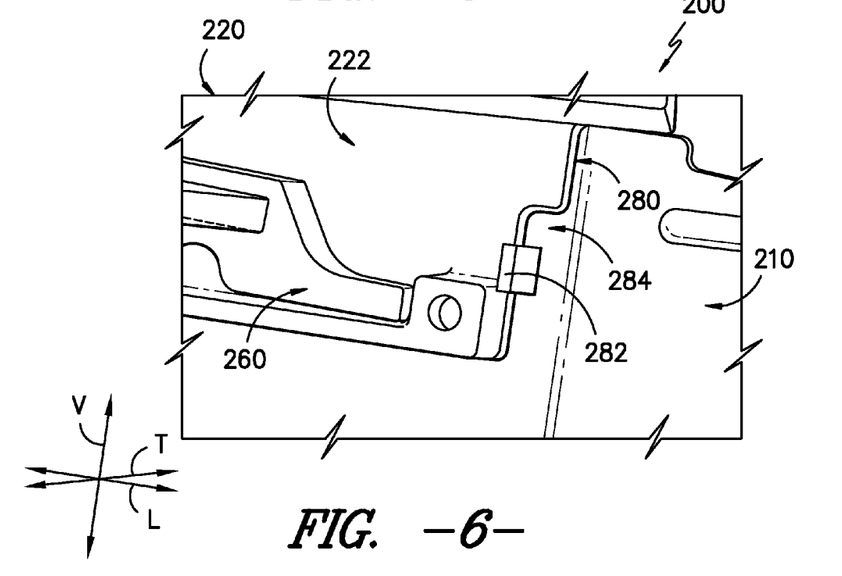
FIG. 6 provides a perspective view of a stop positioned at a back of a fixed shelf of a shelf assembly in accordance with one embodiment of the present disclosure.

As discussed, movable shelf 260 is generally movable relative to fixed shelf 220, such as along the lateral direction L. In some exemplary embodiments, shelf assembly 200 may include components for preventing movement of the movable shelf 260 beyond backs 280 (adjacent distal end portions 212 of brackets 210) of the guides 222 of the fixed shelf 220 when the shelf assembly 200 is assembled. For example, as illustrated in FIG. 6, each bracket 210 may include a stop 282, such as a transversely extending (in the transverse direction T) stop 282. Stop 282 may for example be a protruding tab from the bracket 210. Stop 282 may be positioned adjacent the back 280 of guide 222, and may be configured to prevent movement of the movable shelf 260 past the stop 282 (and beyond the backs 280) in the lateral direction L. Thus, for example, movable shelf 260, such as the guides 262 thereof, may contact the stops 282 when attempting to be moved beyond the retracted position towards and beyond the backs 280 of guides 222, and thus prevented from such movement. Alternatively, pins, clips, or other suitable stop members may be connected to fixed shelf 220, such as to the guides 222 thereof, to prevent movement of the movable shelf 260 beyond the retracted position towards and beyond the backs 280 of guides 222.

Figure 8:
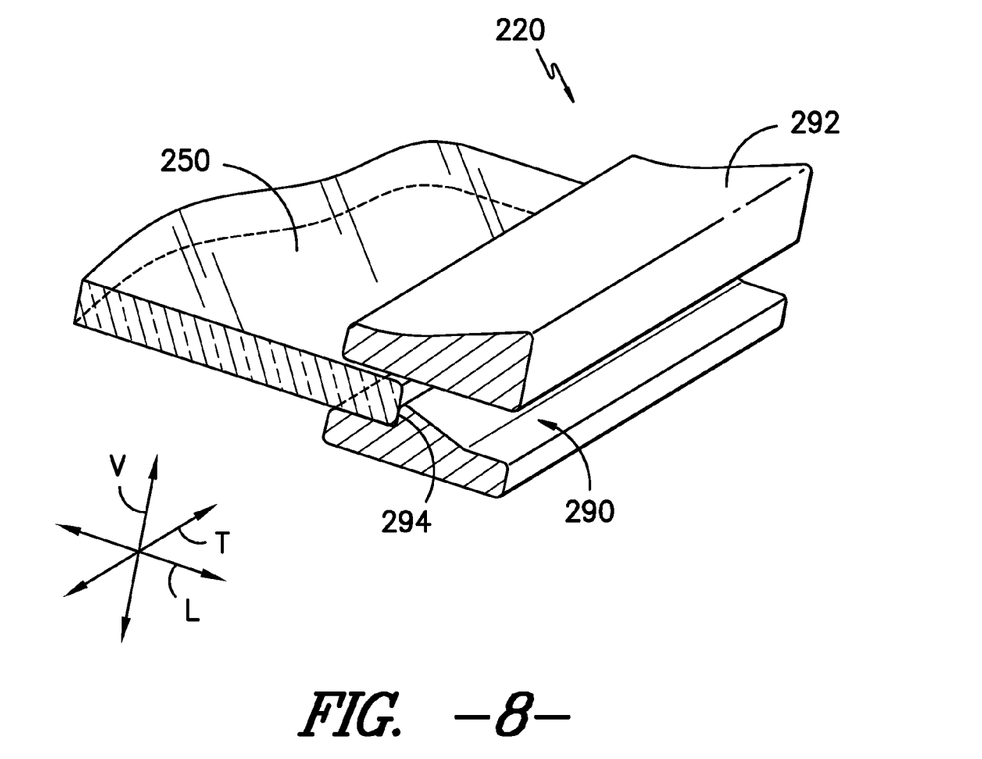
FIG. 8 provides a perspective view of a back member, including a compliant stop, of a fixed shelf of a shelf assembly in accordance with one embodiment of the present disclosure.
Figure 9:
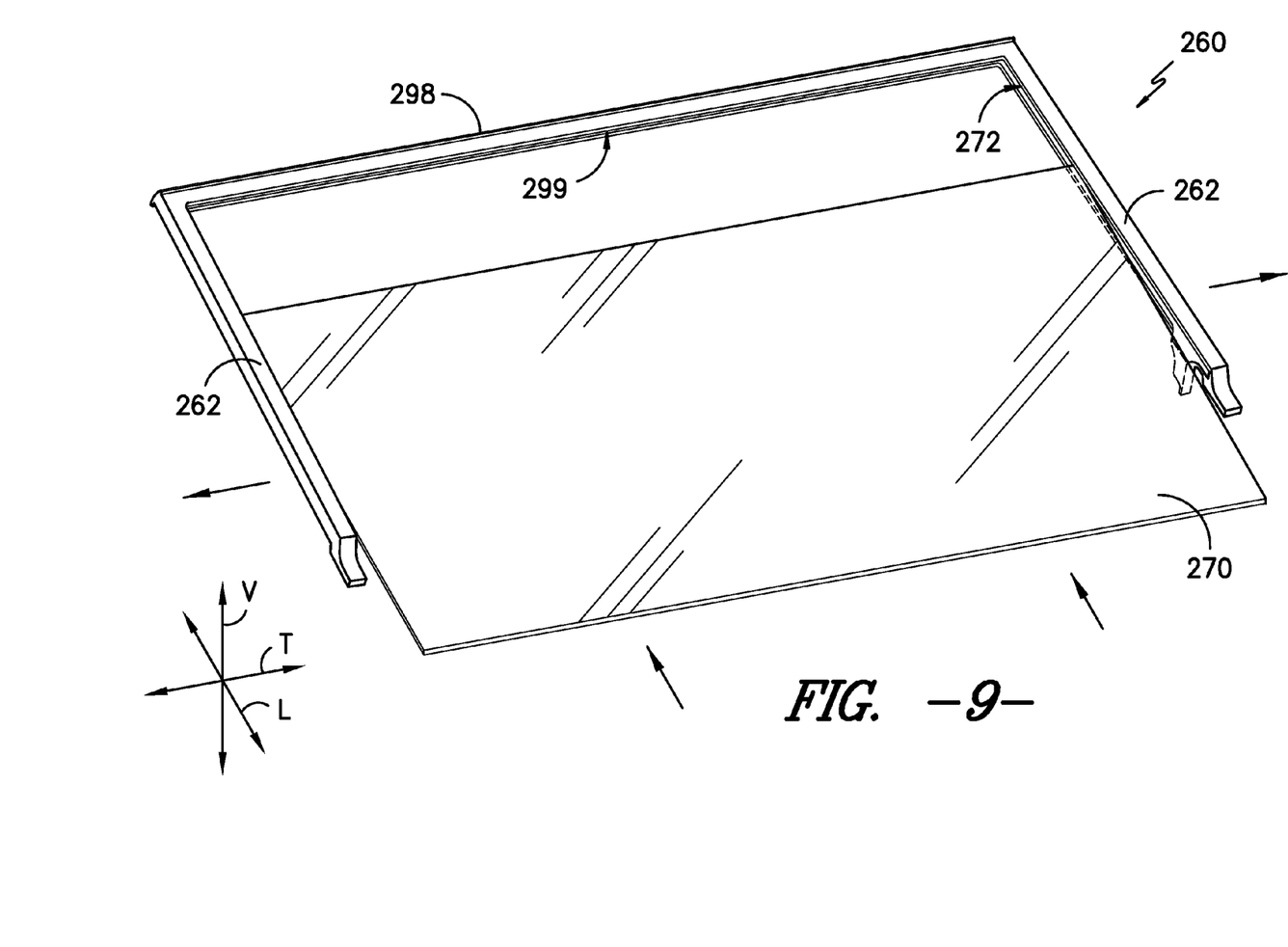
FIG. 9 provides a perspective view of a movable shelf being assembled in accordance with one embodiment of the present disclosure.
Figure 10:
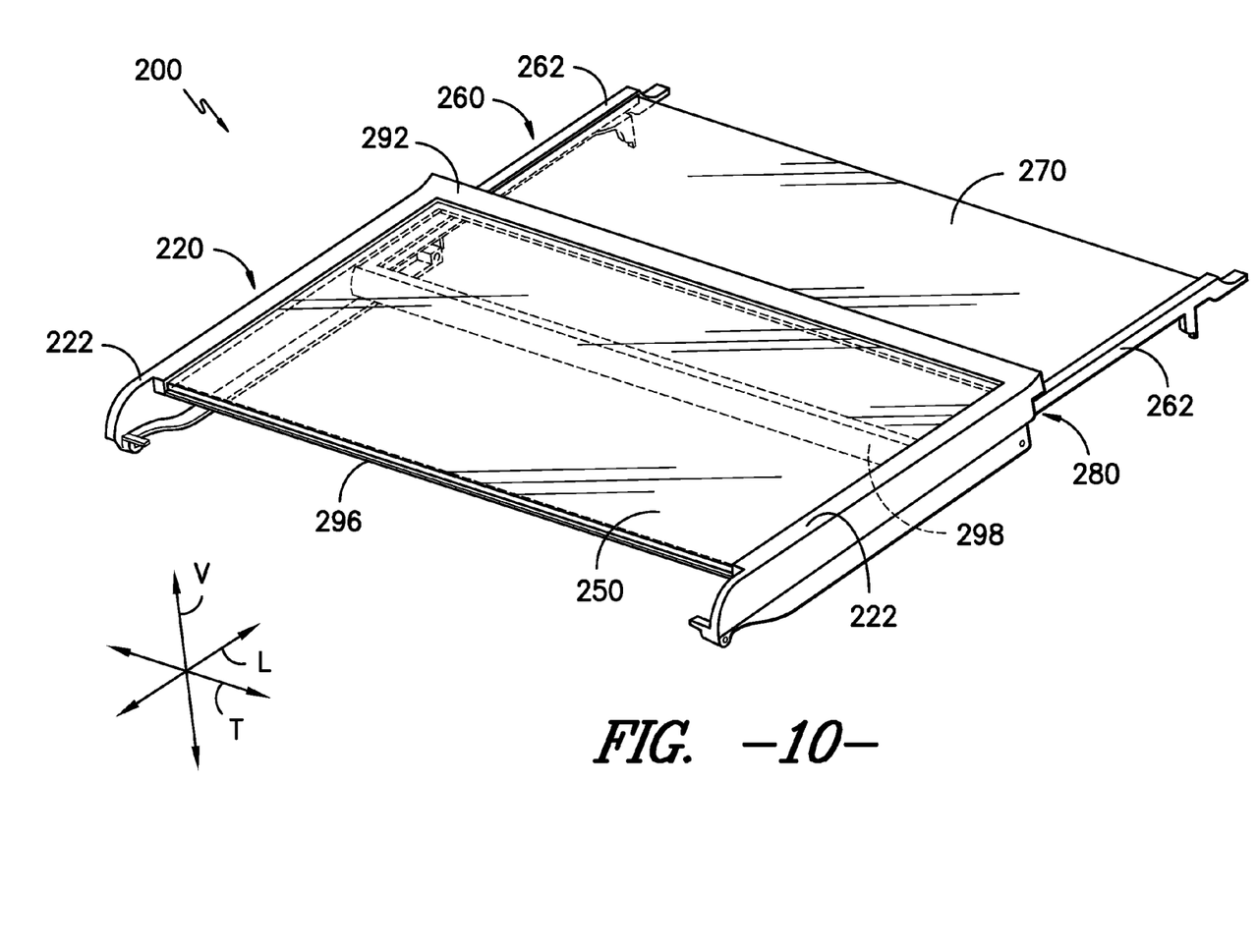
FIG. 10 provides a perspective view of a movable shelf and fixed shelf being assembled to form a shelf assembly in accordance with one embodiment of the present disclosure.

Referring now to FIGS. 7 through 10, the present disclosure is further directed to methods for assembling a shelf assembly 200. Such methods advantageously facilitate efficient and cost-effective assembly. A method may include, for example, sliding a movable shelf 260 through a back entrance 284 defined in a fixed shelf 220, as shown in FIG. 10. The back entrance 284 may be generally defined by the guides 222 of the fixed shelf 220, such as between the guides 222 in the transverse direction T and between the track 242 and guide lip 246 of each guide 222 in the vertical direction V.

In some embodiments, a method may further include, for example, connecting the fixed shelf 220 to a pair of brackets 210, as discussed herein. In exemplary embodiments, such connecting step may occur after the sliding step. Further, in exemplary embodiments, the movable shelf 260 may be prevented from removal through the back entrance 284 when the fixed shelf 220 is connected to the pair of brackets 210. For example, as discussed herein, stops 282 of the brackets 210 may prevent such movement and thus removal of the movable shelf 260. Because the stops 282 are in exemplary embodiments provided on the brackets 210, the movable shelf 260 may be allowed through the back entrance 284 to assemble the shelf assembly 200 before the fixed shelf 220 is connected to the brackets 210, due to the lack of stops 282, and then prevented from movement back through the back entrances 284 after the shelf 220 is connected to the brackets 210. Alternatively, a method may further include, for example, connecting stop members to the fixed shelf 220, such as to the guide members 222 thereof, to prevent such movement.

Figure 7:
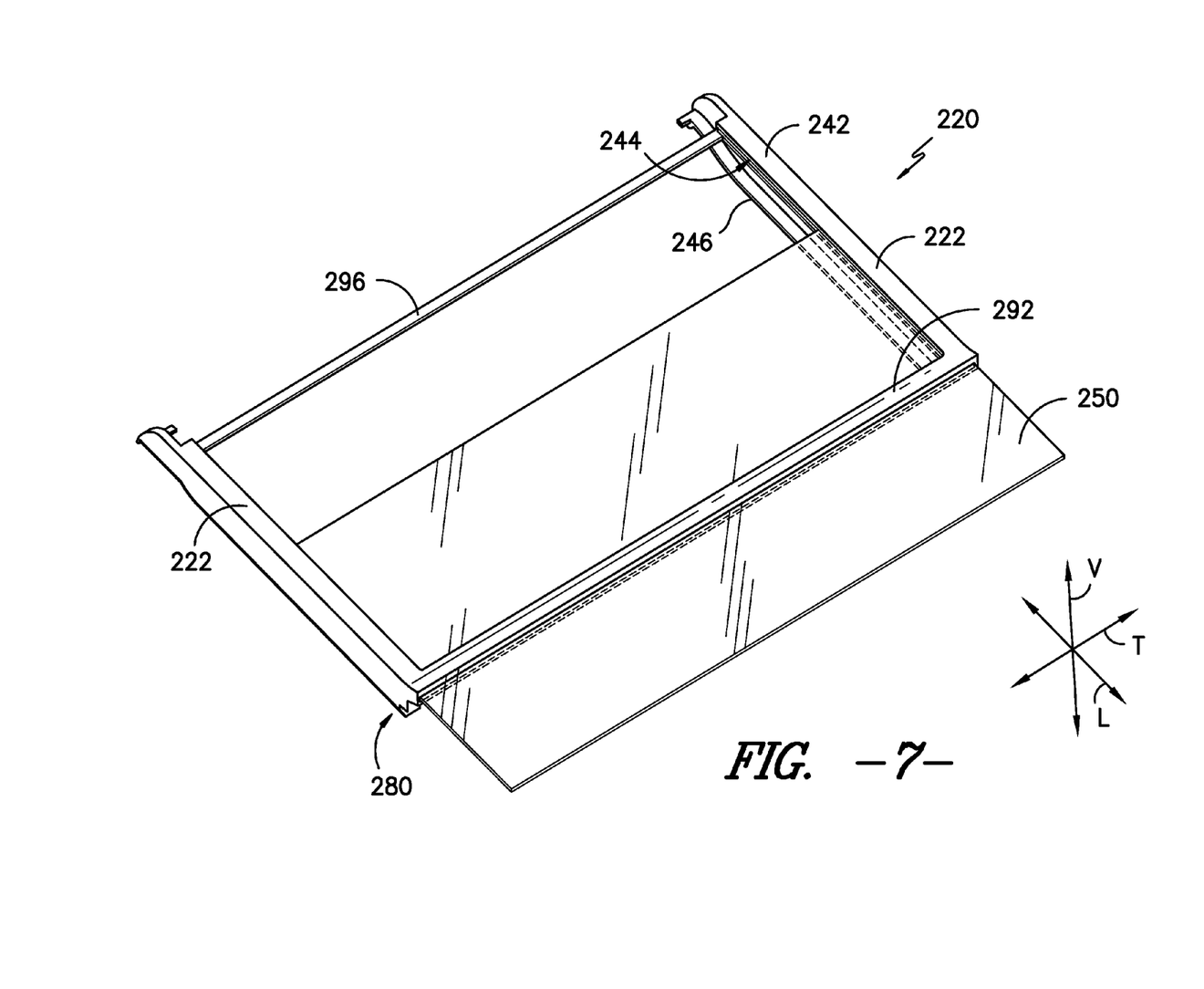
FIG. 7 provides a perspective view of a fixed shelf being assembled in accordance with one embodiment of the present disclosure.

In some embodiments, a method may further include, for example, sliding a platform 250 through a slot 290 defined in a back member 292 of the fixed shelf 220 and over a compliant stop 294 of the back member 292. As shown in FIGS. 7 and 8, fixed shelf 220 may include a front member 296 and back member 292, each of which extends between guides 222 of the fixed shelf 220. Back member 292 may be disposed adjacent back entrance 284 of the fixed shelf 220, and front member 296 may be spaced from the back member 292 along the lateral direction L. Front member 296 may (along with back member 292) prevent movement of guides 222 away from each other, such as in the transverse direction T, and thus prevents platform 250 from being inadvertently dislodged, misplaced, etc. Back member 292 may, as illustrated in FIG. 8, define slot 290 which extends generally along the transverse direction T. Further, back member 292 may include compliant stop 294, which may be formed from rubber or another suitable complaint material. Platform 250 may be slid through the slot 290, such as in the lateral direction L, and into slots 244 of the guides 222 to form fixed shelf 220. Compliant stop 294 may be configured to deform when platform 250 is being slid through the slot 290 to form the fixed shelf 220, and may then rebound to prevent the platform 250 from being removed through the slot 290, as illustrated in FIG. 8.

In some embodiments, a method may further include, for example, sliding a platform 270 between a pair of guides 262 of the movable shelf 260. As shown in FIG. 9, movable shelf 260 may include a front member 298. Platform 270 may be slid between the guides 262 into slots 272 defined in the guides 262 in the lateral direction towards the front member 298. Further, platform 270 may be slid into a slot 299 defined in the front member 298. Thus, movable shelf 260 may be formed.

In exemplary embodiments, sliding of the platforms 250, 270 may occur before sliding the movable shelf 260 through the back entrance 284 defined in the fixed shelf 220. Thus, the movable shelf 260 and fixed shelf 220 may initially be assembled. The shelf assembly 200 may then be assembled from the movable shelf 260 and fixed shelf 220.

Shelf assemblies 200 and methods according to the present disclosure advantageously eliminate the need for brackets and fixed guides which support movable shelves 260 thereof. Such shelf assemblies 200 and methods further eliminate the need for cross-bars, due to the design of the various components of the shelf assembly 200 and the interaction thereof. Such shelf assemblies 200 thus advantageously provide increased storage space in refrigerator appliances 100 while reducing the costs thereof, and such methods advantageously provide efficient and cost-effective assembly thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, the refrigerator appliance defining a vertical direction, a lateral direction, and a transverse direction, the vertical, lateral, and transverse directions being mutually perpendicular, the refrigerator appliance comprising:
a cabinet that defines a chilled chamber for receipt of food items for storage, the cabinet extending between a front portion and a back portion along the lateral direction, the cabinet having a back wall positioned at the back portion of the cabinet and defining an opening for accessing the chilled chamber of the cabinet at the front portion of the cabinet; and
a shelf assembly positioned within the chilled chamber of the cabinet, the shelf assembly comprising:
a fixed shelf, the fixed shelf comprising a pair of guides that each extend along the lateral direction; and
a movable shelf slidably mounted to the fixed shelf, the movable shelf comprising a pair of guides that each extend along the lateral direction and is slidable along the respective one of the pair of guides of the fixed shelf,
wherein in an extended position, the pair of guides of the movable shelf cantilever from the pair of guides of the fixed shelf such that the movable shelf is only supported at rear ends by the fixed shelf and unsupported at front ends of the pair of guides of the movable shelf.

2. The refrigerator appliance of claim 1, wherein each of the pair of guides of the fixed shelf comprises a frame and a track protruding from the frame, and wherein each of the pair of guides of the movable shelf comprises a tab configured to contact one of the tracks when the movable shelf is in the extended position.

3. The refrigerator appliance of claim 1, wherein each of the pair of guides of the fixed shelf comprises a frame and a guide lip protruding from the frame, and wherein the movable shelf is slidable along the guide lip between the extended position and a retracted position.

4. The refrigerator appliance of claim 3, wherein each of the pair of guides of the fixed shelf comprises a support tab extending transversely from the frame and each of the pair of guides of the movable shelf comprises a leg extending vertically therefrom, and wherein each leg is configured to contact one of the support tabs when the movable shelf is in the extended position.

5. The refrigerator appliance of claim 4, further comprising a pair of brackets mounted to the cabinet at the back wall of the cabinet, the pair of brackets spaced apart from each other along the transverse direction, and wherein each of the pair of guides of the fixed shelf is connected to a respective one of the pair of brackets at a first connection, and wherein each first connection is aligned along the vertical direction with the respective support tab of one of the pair of guides of the fixed shelf.

6. The refrigerator appliance of claim 1, further comprising a pair of brackets mounted to the cabinet at the back wall of the cabinet, the pair of brackets spaced apart from each other along the transverse direction, and wherein each guide of the pair of guides is connected to a respective one of the pair of brackets.

7. The refrigerator appliance of claim 6, wherein each of the pair of brackets comprises a transversely extending stop positioned adjacent a back of one of the pair of guides of the fixed shelf, each stop configured to prevent movement of the movable shelf past the stop in the lateral direction.

8. The refrigerator appliance of claim 1, wherein the fixed shelf further comprises a front member and a back member each extending between the pair of guides, and wherein the back member defines a slot and comprises a compliant stop.

9. The refrigerator appliance of claim 1, wherein the movable shelf further comprises a front member extending between the pair of guides.

10. The refrigerator appliance of claim 1, wherein a portion of each of the pair of guides of the movable shelf extends beyond each of the pair of guides of the fixed shelf when the movable shelf is in the extended position.

11. The refrigerator appliance of claim 6, wherein a portion of each of the pair of guides of the movable shelf extends beyond each of the pair of brackets when the movable shelf is in the extended position.

12. A shelf assembly, the shelf assembly defining a vertical direction, a lateral direction, and a transverse direction, the vertical, lateral, and transverse directions being mutually perpendicular, the shelf assembly comprising:
   a fixed shelf, the fixed shelf comprising a pair of guides that each extend along the lateral direction; and
   a movable shelf slidably mounted to the fixed shelf, the movable shelf comprising a pair of guides that each extend along the lateral direction and is slidable along the respective one of the pair of guides of the fixed shelf,
   wherein in an extended position, the pair of guides of the movable shelf cantilever from the pair of guides of the fixed shelf such that the movable shelf is only supported at rear ends by the fixed shelf and unsupported at a front end of the movable shelf.

13. The shelf assembly of claim 12, wherein each of the pair of guides of the fixed shelf comprises a frame and a track protruding from the frame, and wherein each of the pair of guides of the movable shelf comprises a tab configured to contact one of the tracks when the movable shelf is in the extended position.

14. The shelf assembly of claim 12, wherein each of the pair of guides of the fixed shelf comprises a frame and a guide lip protruding from the frame, and wherein the movable shelf is slidable along the guide lip between the extended position and a retracted position.

15. The shelf assembly of claim 14, wherein each of the pair of guides of the fixed shelf comprises a support tab extending transversely from the frame and each of the pair of guides of the movable shelf comprises a leg extending vertically therefrom, and wherein each leg is configured to contact one of the support tabs when the movable shelf is in the extended position.

16. The shelf assembly of claim 15, further comprising a pair of brackets, the pair of brackets spaced apart from each other along the transverse direction, and wherein each of the pair of guides of the fixed shelf is connected to a respective one of the pair of brackets at a first connection, and wherein each first connection is aligned along the vertical direction with the respective support tab of one of the pair of guides of the fixed shelf.

17. A method for assembling a shelf assembly, the method comprising:
   sliding a movable shelf through a back entrance defined in a fixed shelf such that the movable shelf is slidable between an extended position and a retracted position, and
   wherein in the extended position, the movable shelf cantilevers from the fixed shelf such that the movable shelf is only supported at rear ends by the fixed shelf and unsupported at a front end of the movable shelf.

18. The method of claim 17, further comprising connecting the fixed shelf to a pair of brackets.

19. The method of claim 18, wherein the connecting step occurs after the sliding step.

20. The method of claim 18, wherein the movable shelf is prevented from removal through the back entrance when the fixed shelf is connected to the pair of brackets.

* * * * *